(12) United States Patent
Parker, III et al.

(10) Patent No.: US 10,223,698 B2
(45) Date of Patent: Mar. 5, 2019

(54) INTEGRATING A WEB-BASED CRM SYSTEM WITH A PIM CLIENT APPLICATION

(71) Applicant: Microsoft Technology Licensing, LLC, Redmond, WA (US)

(72) Inventors: Wayne Carlyle Walsh Parker, III, Mercer Island, WA (US); Michael J. McCormack, Snohomish, WA (US); Tobin James Zerba, Seattle, WA (US); Praveen Upadhyay, Bellevue, WA (US); Nicholas James Thomson, Redmond, WA (US); Sharad Bajaj, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 15/164,043

(22) Filed: May 25, 2016

(65) Prior Publication Data

US 2016/0371700 A1 Dec. 22, 2016

Related U.S. Application Data

(63) Continuation of application No. 12/820,166, filed on Jun. 22, 2010, now Pat. No. 9,390,399.

(51) Int. Cl.
*G06F 17/00* (2006.01)
*G06Q 30/00* (2012.01)
(Continued)

(52) U.S. Cl.
CPC .......... *G06Q 30/01* (2013.01); *G06F 3/0481* (2013.01); *G06F 9/451* (2018.02); *G06Q 10/10* (2013.01); *G06Q 30/02* (2013.01)

(58) Field of Classification Search
CPC ........ G06F 17/30; G06Q 30/01; G06Q 10/10; G06Q 30/02
See application file for complete search history.

(56) References Cited

U.S. PATENT DOCUMENTS 7,269,605 B1 * 9/2007 Nguyen ................. G06Q 10/10
7,685,515 B2 * 3/2010 Braud .................... G06Q 10/06
715/234

(Continued)

FOREIGN PATENT DOCUMENTS

CN CN1744121 A 3/2006

OTHER PUBLICATIONS

Translated Chinese Office Action dated Jul. 3, 2015 for Chinese patent application No. 201110185081.3, counterpart foreign application of U.S. Appl. No. 12/820,166, 12 pages.

(Continued)

*Primary Examiner* — Mohammed H Zuberi
(74) *Attorney, Agent, or Firm* — Workman Nydegger (57) ABSTRACT

A customer relationship management (CRM) system utilizes a form definition, user interface (UI) definitions, and UI code to generate Web pages for interacting with CRM data. A CRM plug-in is configured to execute in conjunction with a personal information manager (PIM) client application and to utilize the same form definition, UI definitions, and UI code utilized by the CRM system to generate the Web-based CRM interface. The UI definitions are utilized to present UI controls for performing CRM-related functionality in the context of a UI generated by the PIM client application. The UI code utilized by the CRM system to implement Web-based UI controls can be utilized to implement the UI controls in the context of the PIM client application. The (Continued)

form definition utilized by the CRM system might be utilized to display CRM fields in the UI presented by the PIM client application.

20 Claims, 6 Drawing Sheets (51) Int. Cl.
| | |
|---|---|
| *G06Q 10/10* | (2012.01) |
| *G06Q 30/02* | (2012.01) |
| *G06F 3/0481* | (2013.01) |
| *G06F 9/451* | (2018.01) |

(56) References Cited

U.S. PATENT DOCUMENTS

| | | | | |
|---|---|---|---|---|
| 7,779,085 | B2* | 8/2010 | Neil | G06F 9/4443 709/217 |
| 8,417,715 | B1* | 4/2013 | Bruckhaus | G06F 17/30994 705/26.1 |
| 2005/0108052 | A1* | 5/2005 | Omaboe | G06Q 50/22 705/2 |
| 2005/0154742 | A1* | 7/2005 | Roth | G06F 8/00 |
| 2005/0198158 | A1* | 9/2005 | Fabre | G06Q 10/107 709/206 |
| 2005/0228790 | A1* | 10/2005 | Ronnewinkel | G06F 17/30705 |
| 2006/0069684 | A1* | 3/2006 | Vadlamani | G06F 17/30569 |
| 2006/0080363 | A1* | 4/2006 | Vadlamani | G06Q 10/10 |
| 2006/0190813 | A1* | 8/2006 | Neil | G06F 9/445 715/202 |
| 2006/0212299 | A1* | 9/2006 | Law | G06F 17/30011 715/748 |
| 2006/0242124 | A1* | 10/2006 | Fields | G06F 8/38 |
| 2007/0055943 | A1* | 3/2007 | McCormack | G06F 3/0481 715/746 |
| 2007/0078925 | A1* | 4/2007 | Neil | G06F 17/30905 709/201 |
| 2007/0100845 | A1* | 5/2007 | Sattler | G06F 17/30557 |
| 2008/0075062 | A1* | 3/2008 | Neil | G06F 9/451 370/351 |
| 2008/0082572 | A1* | 4/2008 | Ballard | G06F 17/30392 |
| 2008/0086527 | A1* | 4/2008 | Sposetti | G06Q 10/10 709/204 |
| 2008/0126486 | A1* | 5/2008 | Heist | G06Q 10/10 709/205 |
| 2008/0147625 | A1* | 6/2008 | Altounian | G06Q 10/087 |
| 2009/0083633 | A1 | 3/2009 | Toner | |
| 2009/0187531 | A1* | 7/2009 | Singh | G06Q 10/10 |
| 2009/0319921 | A1* | 12/2009 | Abel | G06F 8/38 715/760 |
| 2010/0138734 | A1 | 6/2010 | Braud et al. | |
| 2011/0302487 | A1* | 12/2011 | McCormack | G06F 8/76 715/239 |
| 2011/0314266 | A1* | 12/2011 | Mondri | G06F 9/485 713/2 |
| 2011/0314366 | A1 | 12/2011 | Parker, III et al. | |

OTHER PUBLICATIONS

"Email and Productivity", Retrieved at<<http://www.salesforce.com/crm/sales-force-automation/sales-tools/ >>, Retrieved Date: Apr. 5, 2010, pp. 2.

"Extending Enterprise Applications with Microsoft Outlook: Architectural Design Guide", Retrieved at <<http://msdn.microsoft.com/en-us/library/aa479348.aspx>>, Jan. 2006, pp. 13.

Manetstatter, "Vtiger CRM Outlook Plugin Doumentation", Outlook Plugin Version 1.0.04, Different Solutions GmbH, Mar. 2013, 40 pages.

"Microsoft Outlook CRM Software with Fully Integrated Email Marketing System", Retrieved at << http://www.salesoutlook.net/ >>, Retrieved Date: Apr. 5, 2010, p. 1.

"Microsoft Outlook Integration", Retrieved at << http://vtiger.com/products/crm/microsoft-outlook-integration.html >>, Retrieved Date: Apr. 5, 2010, p. 1.

Office action for U.S. Appl. No. 12/820,166, dated Jan. 20, 201, Parker et al., "Integrating a Web-based CRM System with a PIM Client Application", 15 pages.

Office action for U.S. Appl. No. 12/820,166, dated Jan. 5, 2015, Parker et al., "Integrating a Web-based CRM System with a PIM Client Application", 20 pages.

Final Office action for U.S. Appl. No. 12/820,166, dated Oct. 9, 2015, Parker et al., "Integrating a Web based CRM System with a PIM Client Application", 22 pages.

Office action for U.S. Appl. No. 12/820,166, dated Feb. 27, 2014, Parker et al., "Integrating a Web based CRM System with a PIM Client Application", 18 pages.

Office action for U.S. Appl. No. 12/820,166, dated Jul. 19, 2012, Parker et al., "Integrating a Web-based CRM System with a PIM Client Application", 18 pages.

Office action for U.S. Appl. No. 12/820,166, dated Aug. 13, 2014, Parker et al., "Integrating a Web-based CRM System with a PIM Client Application", 19 pages.

"Prophet—Easy CRM Software for Outlook", Retrieved at <<http://www.avidian.com/Customer-Relationship-Management/ol-crm.aspx >>,Retrieved Date: Apr. 5, 2010, pp. 2.

"Softomate—The Leader in Web-Browser and Outlook Plug-Ins Development", Retrieved at << http://softomate.com/products/sync_crm/?gclid=CPWNoLDk7qACFdyX2Aod1XjLMA>>, Retrieved Date: Apr. 5, 2010, pp. 2.

\* cited by examiner

INTEGRATING A WEB-BASED CRM SYSTEM WITH A PIM CLIENT APPLICATION

CROSS REFERENCE TO RELATED APPLICATIONS

This application is a continuation of co-pending U.S. application Ser. No. 12/820,166 filed Jun. 22, 2010 entitled "Integrating a Web-Based CRM System with a PIM Client Application", which is expressly incorporated herein by reference in its entirety.

BACKGROUND

Customer relationship management ("CRM") systems allow users to create and utilize information relevant to business relationships. For instance, a CRM system may allow users to create, view, edit, modify, and otherwise utilize information regarding customers or potential customers, contact with the customers, sales made to customers, customer support information, marketing information, and other types of information that may be relevant to a business relationship or potential business relationship. CRM systems typically provide a World Wide Web ("Web") based user interface ("UI") for performing this functionality. As an example, a CRM system might provide a Web-based UI through which a user can send electronic mail ("e-mail") messages to customers or potential customers, manage appointments with customers, and perform other business tasks.

While the Web-based UIs provided by most CRM systems are robust, many users still prefer to utilize a personal information manager ("PIM") client application program to send and receive e-mail, to manage appointments, and to perform other customer-related tasks. Currently, however, users typically have to choose between leveraging the features provided by Web-based CRM systems, such as e-mail templates, and the rich e-mail experience provided by PIM client application programs. For instance, some users might compose new e-mail messages using a PIM client application, and then utilize the Web UI provided by a CRM system to perform actions on the e-mail messages. Using both a PIM client application and a Web-based CRM system can be a time consuming and frustrating process for some users.

It is with respect to these and other considerations that the disclosure made herein is presented.

SUMMARY

Technologies are described herein for integrating a Web-based CRM system and a PIM client application. Through the utilization of the technologies and concepts presented herein, the functionality provided by a Web-based UI generated by a CRM system may be integrated within a UI provided by a PIM client application program. In this manner, a user of the PIM client application can perform actions on CRM data directly within the PIM client application without having to utilize the Web-based UI provided by the CRM system.

According to one aspect presented herein, a CRM system utilizes a form definition, UI definitions, UI code, and validation code to generate Web pages for accessing and interacting with CRM data. For instance, the CRM system might generate a Web page for sending an e-mail message to a customer. The form definition defines one or more CRM fields to be provided in the e-mail message. The UI definitions define one or more UI controls for performing CRM-related functionality that should be presented in the Web page. The UI code comprises code for implementing the functionality provided by the UI controls when selected. The validation code comprises code for validating data entered into the CRM fields on the Web page.

In order to enable CRM functionality within the PIM client application, a CRM plug-in may be executed in conjunction with the PIM client application in one embodiment. The CRM plug-in is configured to utilize the same form definition, UI definitions, UI code, and validation code utilized by the CRM system to generate the Web-based CRM interface. For instance, when a new CRM-related e-mail message is created within the PIM client application, the UI definitions might be utilized to present UI controls for performing CRM-related functionality. When a UI control is selected, the same UI code utilized by the CRM system to implement Web-based UI controls can be utilized to implement the functionality provided by the selected UI control in the context of the PIM client application.

According to other aspects, the form definition utilized by the CRM system to generate fields in a Web page might be utilized to display CRM fields in the UI presented by the PIM client application. For instance, CRM fields for inputting and displaying CRM data can be displaying along with standard e-mail fields (e.g. to:, cc:, subject, etc.) in an e-mail message. The validation code utilized by the CRM system when validating input made to Web pages might also be utilized in the context of the PIM client application to validate data input into the CRM fields. Data entered into the CRM fields can be posted to the CRM system for storage and the e-mail message can be associated with CRM objects maintained by the CRM system. These concepts might also be utilized with other UIs presented by the PIM client application, such as UIs for creating and managing appointments, and others.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for integrating a Web-based CRM system and a PIM client application. A CRM system utilizes form definitions, UI definitions, and UI code to generate Web pages for interacting with CRM data. A CRM plug-in is configured to execute in conjunction with a PIM client application and to utilize the same form definitions, UI definitions, and UI code utilized by the CRM system to generate the Web-based CRM interface. The UI definitions are utilized to present UI controls for performing CRM-related functionality in the context of a UI generated by the PIM client application. The UI code utilized by the CRM system to implement Web-based UI controls can be utilized to implement the UI controls in the context of the PIM client application. The form definition utilized by the CRM system might be utilized to display CRM fields in the UI presented by the PIM client application.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system, methodology, or computer-readable storage medium for integrating a Web-based CRM system and a PIM client application will be described.

Figure 1:
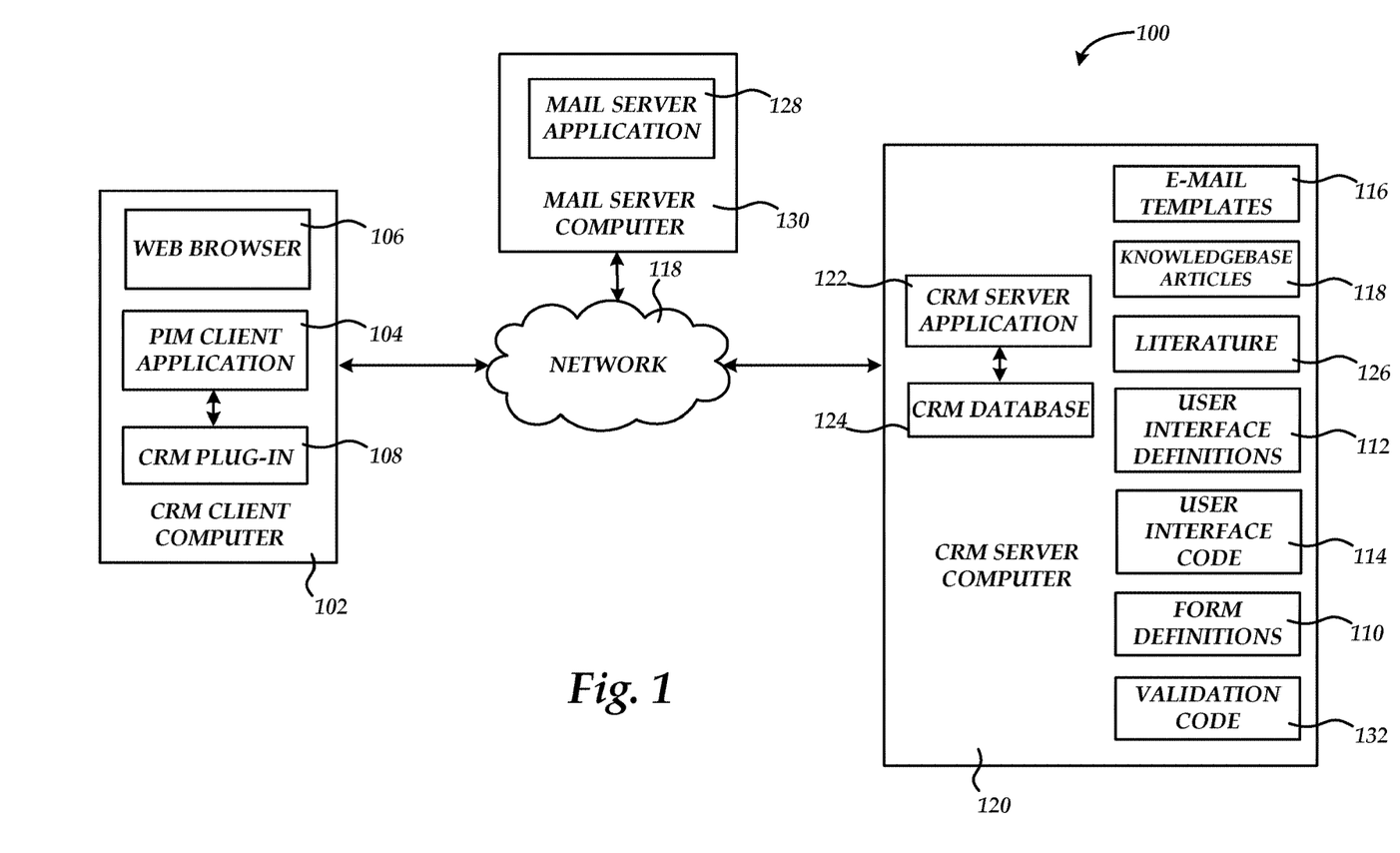
FIG. 1 is a computer network architecture diagram showing aspects of several computing systems provided in embodiments disclosed herein.

Turning now to FIG. 1, details will be provided regarding one embodiment presented herein for integrating a Web-based CRM system and a PIM client application. In particular, FIG. 1 is a network diagram showing one illustrative operating environment 100 for the embodiments presented herein. As shown in FIG. 1, the environment 100 includes a CRM client computer 102 that is coupled to a CRM server computer 120 by way of a network 118. The CRM client computer 102 comprises a standard desktop, laptop, or other type of computing device configured to execute a PIM client application 104 and a CRM plug-in 108.

The PIM client application 104 comprises a program for viewing, managing, and otherwise interacting with personal information, such as electronic mail messages, contacts, a calendar, tasks, notes, to do list items, and other personal information that may be maintained by a user of the CRM client computer 102. The PIM client application 104 may maintain a database storing the personal information. The PIM client application 104 may also interact with one or more server computers that also store a database containing a user's personal information.

According to embodiments, the PIM client application 104 may be configured to provide functionality for sending and receiving e-mail messages. For instance, the PIM client application 104 might provide a UI for allowing a user to create a new e-mail message. The PIM client application 104 might also allow the user to send the e-mail message to a desired recipient through one or more e-mail server computers, such as the mail server computer 130 that executes the mail server application 128. The PIM client application 104 might also provide functionality for allowing the user to create calendar items, maintain a contacts list, create to do list items, and to perform other functions. In one embodiment, the PIM client application 104 comprises the OUTLOOK PIM client application from MICROSOFT CORPORATION. It should be appreciated that the technologies disclosed herein might be implemented with other PIM client applications. The technologies presented herein might also be implemented with other types of client applications other than PIM client applications.

The CRM client computer 102 may also execute a Web browser 106 in one embodiment. As known to those skilled in the art, the Web browser 106 is a computer program that is configured to request, receive, and render Web pages and associated content. For instance, in one implementation, the CRM server computer 120 (which may be referred to herein as the "CRM system") is configured to execute a CRM server application 122 that provides a Web-based interface to CRM data. As discussed briefly above, CRM data refers to any data maintained by an organization that is relevant to an existing or potential customer relationship. For instance, CRM data may include, but is not limited to, information regarding customers, contact with the customers, sales made to customers, customer support information, marketing information, and other types of information that may be relevant to a customer relationship or potential customer relationship.

Through the use of the Web browser 106, a user of the CRM client computer 102 may utilize the Web-based CRM functionality provided by the CRM server computer 120. As an example, the CRM server computer 120 might provide a Web-based UI through which a user of the CRM client computer 102 can send e-mail messages to customers or potential customers, manage appointments with customers, and perform other business tasks. The Web-based UI provided by the CRM server computer 120 might also provide functionality for performing other CRM-related tasks. Additional details regarding the provision of a Web-based UI for performing CRM tasks by the CRM server computer will be provided below with regard to FIG. 3.

According to one implementation, the PIM client application 104 is also configured to execute in conjunction with a CRM plug-in 108. The CRM plug-in 108 operates in conjunction with the PIM client application 104 to provide functionality for allowing a user of the CRM client computer 102 to view, modify, and otherwise interact with CRM data. The functionality provided by the CRM plug-in 108 may be integrated with the operation of the PIM client application 104 such that a user interface provided by the CRM server computer 120 is integrated with a user interface provided by the PIM client application 104. In this manner, a user of the CRM client computer 102 may access, view, and modify CRM data directly from within the PIM client application 104 utilizing the functionality provided by the CRM plug-in 108.

The CRM plug-in 108 is configured to operate in conjunction with the CRM server application 122 executing on the CRM server computer 120. As discussed briefly above, the CRM server computer 120 provides functionality for allowing users to create and utilize CRM data. The CRM server computer 120 is a standard server computer configured to execute the CRM server application 122 and, potentially, other applications. As illustrated in FIG. 1, the CRM server application 122 maintains a CRM server database 124. The CRM server database 124 is utilized to store CRM data. Through the functionality provided by the CRM plug-in 108, a user of the CRM client computer 102 can retrieve, view, and modify CRM data stored in the CRM server database 124.

According to one embodiment, the Web-based UI provided by the CRM server computer 102 and the PIM client application 104 are integrated. In particular, the functionality provided by the Web-based UI generated by a CRM server computer 120 is integrated within a UI provided by the PIM client application 104. In this manner, a user of the PIM client application 104 can perform actions on CRM data directly within the PIM client application 104 without having to utilize a Web browser application program to access the Web-based UI provided by the CRM server computer 120.

In order to provide the functionality disclosed herein, the CRM plug-in 108 may utilize one or more application programming interfaces ("APIs") exposed by the PIM client application 104. For instance, the CRM plug-in is configured in one embodiment to display UI controls for performing CRM functions in an "inspector" UI generated by the PIM client application 104. As an example, when a user of the CRM client computer 102 creates a new e-mail message, the PIM client application 104 might display a UI interface for inspecting and setting the properties of the e-mail message (referred to herein as an "inspector"). When such a UI is displayed, the CRM plug-in 108 might utilize public APIs exposed by the PIM client application 104 to cause UI controls for performing CRM functions to be displayed in the inspector UI. In the event that CRM fields already exist in the PIM application, those fields might be utilized by mapping the existing CRM data into those fields. In this manner, the user is permitted to utilize the potentially more familiar PIM application controls as opposed to the CRM fields generated by the CRM plug-in.

The CRM plug-in 108 might also utilize one or more public APIs exposed by the PIM client application 104 to cause data fields for viewing and entering CRM data, referred to herein as "CRM fields," to be displayed within the inspector UI. A user of the CRM client computer 102 can then enter data in the CRM fields. The provided data may then be published to the CRM server application 122 and stored in the CRM database 124. Additional details regarding various processes by which the CRM plug-in 108 causes UI controls and CRM fields to be displayed in an inspector UI generated by the PIM client application 104 will be described below with regard to FIG. 4. It should be appreciated that while an inspector UI for creating an e-mail message is utilized herein to illustrate the disclosed embodiments, inspector UIs and other types of UIs for inspecting other types of data might also be utilized. For instance, inspectors displayed by the PIM client application 104 for inspecting contacts, meetings, to do items, might also be utilized in conjunction with the embodiments disclosed herein.

It should be appreciated that, while the embodiments described herein have been presented in the context of a CRM plug-in 108 that executes in conjunction with a CRM server application 122, the embodiments presented herein might be utilized with any business application plug-in. A business plug-in is a plug-in that operates in conjunction with a PIM client application 104 to access any kind of business data. Additionally, it should also be appreciated that the embodiments presented herein might be utilized in other types of operating environments. For instance, the functionality described herein might be utilized by a standalone application for interacting with CRM or other types of business data that does not utilize a plug-in component. The functionality presented herein might also be integrated directly within the PIM client application 104. Other types of implementations will also be apparent to those skilled in the art.

As shown in FIG. 1, the CRM client computer 102 and the CRM server computer 120 communicate over the network 118. The network 118 is a computing network configured for enabling data communications between the CRM client computer 102 and the CRM server computer 120. In one embodiment, the network 118 comprises the Internet, however, it should be appreciated that the network 118 may comprise any type of local area or wide area network. Additionally, the network 118 has been shown in a simplified form. Therefore, it should be appreciated that the network 118 may comprise many different networking components and computer systems distributed over a large geographic area. It should also be appreciated that although FIG. 1 illustrates only a single CRM client computer 102 and a single CRM server computer 120 being connected to the network 118, many other computing devices may also be connected to the network 118 and enabled for data communication over the network 118.

Figure 2A:
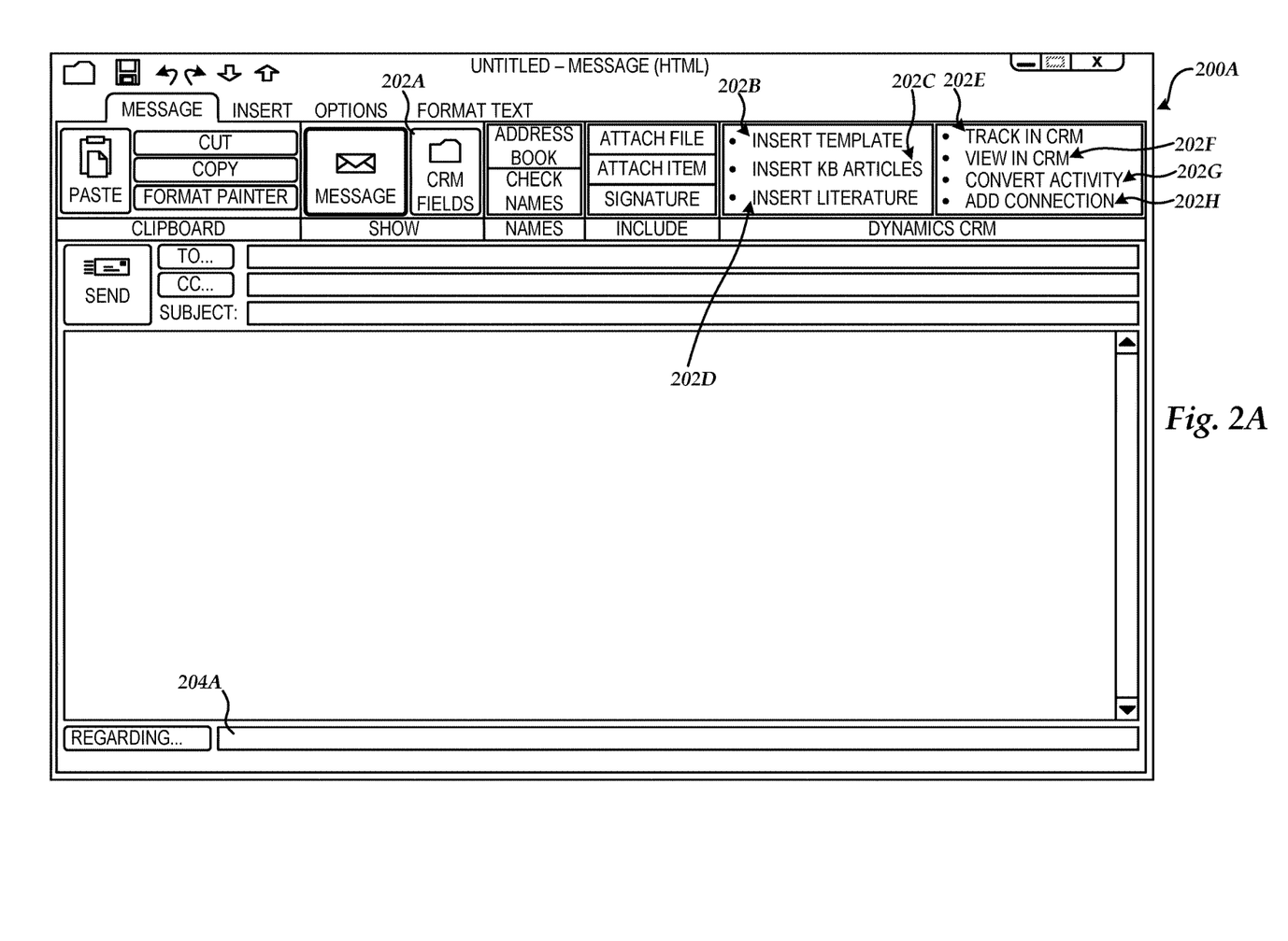
FIGS. 2A-2B are user interface diagrams showing aspects of a UI provided by a PIM client application and a CRM plug-in in one embodiment presented herein.
Figure 2B:
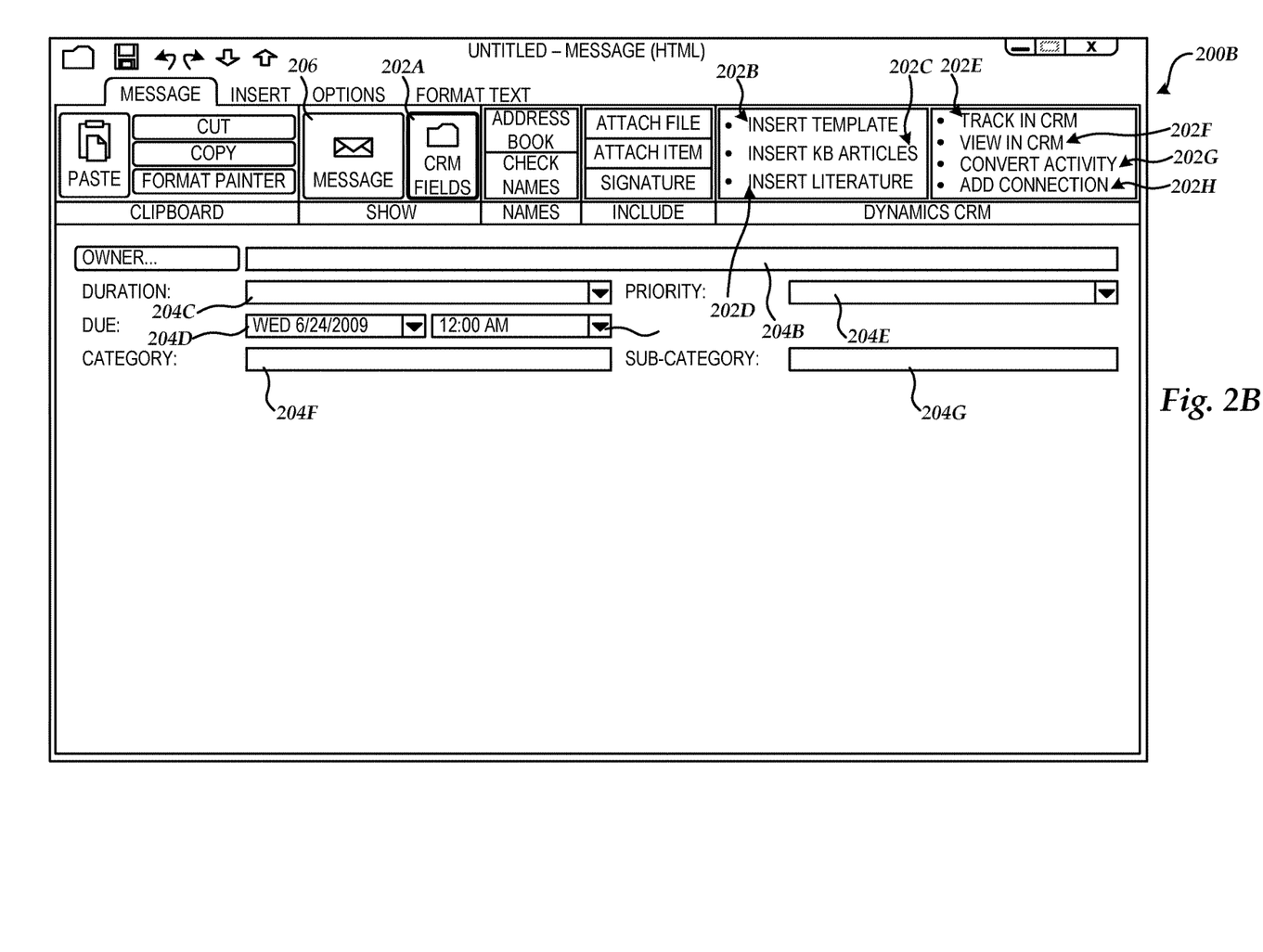

Referring now to FIGS. 2A and 2B, several user interface diagrams showing aspects of a UI 200A-200B provided by the PIM client application 104 and the CRM plug-in 108 will be described. In particular, FIG. 2A shows an inspector UI 200A generated by the PIM client application 104. The example UI 200A shown in FIG. 2A is generated by the PIM client application 104 in response to receiving a request from a user of the CRM client computer 102 to create a new e-mail message. The UI 200A includes a number of standard user interface controls and native fields that are typically provided when a user requests to create a new e-mail message. For instance, the UI 200A includes UI controls for attaching files, inserting a signature, checking names, and for performing other functions. The UI 200A also shows native e-mail fields for specifying one or more e-mail addresses for the recipient of the e-mail message, carbon copy recipients, and a subject for the new e-mail message.

In addition to the UI controls and e-mail fields generated by the PIM client application 104, the UI 200A also includes a number of UI controls 202A-202H that have been generated by the CRM plug-in 108. As discussed above, the CRM plug-in 108 might utilize one or more APIs exposed by the PIM client application 104 to cause the UI controls 202A-202H to be displayed in the UI 200A. The UI controls 202B-202H provide functionality for performing CRM-related tasks with respect to the newly created e-mail message. For instance, the UI control 202B will cause an e-mail template 116 to be inserted into the new e-mail message when selected. The UI control 202C will cause a knowledgebase article 118 to be inserted into the new e-mail message when selected. The UI control 202D will cause literature 126 to be inserted or attached to the new e-mail message. For instance, sales literature or other types of documents might be attached to the e-mail message through the selection of the UI control 202D. As discussed above, in the event that CRM fields already exist in the PIM application, those fields might be utilized by mapping the existing CRM data into those fields. This prevents duplication of fields and allows a user to work within the UI provided directly by the PIM client application 104 whenever possible.

Selection of the UI control 202E will cause the new e-mail message to be tracked by the CRM server application 122. Selection of the UI control 202F will cause a CRM object maintained by the CRM server application 122 corresponding to the new e-mail message to be displayed. For instance, a Web page provided by the CRM server application 122 showing details about the corresponding CRM object may be displayed by the Web browser 106. The UI control 202G will cause the newly created e-mail message to be converted to a CRM activity in the CRM database 124. For instance, the newly created e-mail message might be converted to a follow-up object indicating that a follow-up should be made with a customer that is the subject of the e-mail message. The UI control 202H may be selected in order to correlate one CRM entity with another CRM entity. For instance, the e-mail message that is the subject of the UI 200A may be correlated with another CRM object in the CRM database 124.

It should be appreciated that the UI controls 202B-202H are merely illustrative and that fewer or additional UI controls might also be displayed within the UI 200A utilizing the technologies presented herein. Additional details regarding the various processes utilized by the CRM plug-in 108 to cause the UI controls 202B-202H to be displayed within the UI 200A provided by the PIM client application 104 will be described below with reference to FIG. 4.

As also shown in FIG. 2A, a CRM field 204A has also been displayed by the CRM plug-in 108 in the UI 200A generated by the PIM client application 104. As discussed briefly above, the PIM client application 104 might utilize one or more APIs exposed by the Web browser 106 and the PIM client application 104 to display CRM data fields for viewing and entering CRM data. In the UI 200A, the CRM plug-in 108 has caused the PIM client application 104 to display the field 204A. The field 204A can be utilized to specify CRM data that indicates what the e-mail message that is the subject of the UI 200A is regarding. Additionally, the UI control 202A may also be selected in order to view other CRM fields that may be specified in conjunction with the newly created e-mail message. When the UI control 202A is selected, the user interface 200B shown in FIG. 2B is displayed by the PIM client application 104.

The UI 200B shown in FIG. 2B includes the UI controls 202A-202H. The UI 200B also includes a number of additional CRM fields 204B-204G. As discussed above, the CRM fields 204B-204G correspond to CRM data stored in the CRM database 124. The CRM fields 204B-204G may be utilized by a user of the CRM client computer 102 to add additional CRM data to the newly created e-mail message. The data specified by way of the CRM fields 204B-204G and mapped PIM fields can be stored in the CRM database 124. A user may select the UI controls 206 to return to the UI 200A shown in FIG. 2A.

As will be described in greater detail below with respect to FIG. 4, the CRM plug-in 108 utilizes the same components in order to cause the PIM client application 104 to display the user interface controls 202A-202H and the CRM fields 204A-204G that the CRM server application 122 utilizes to provide a Web-based user interface for creating a new e-mail message. By utilizing the same components, the user interface provided by the PIM client application 104 can provide functionality that is consistent with the functionality provided by the CRM server application 122. Additional details regarding the processes by which the CRM plug-in 108 utilizes components that are also utilized by the CRM server application 122 to provide a Web-based UI will be provided below with respect to FIGS. 3-4.

Figure 3:
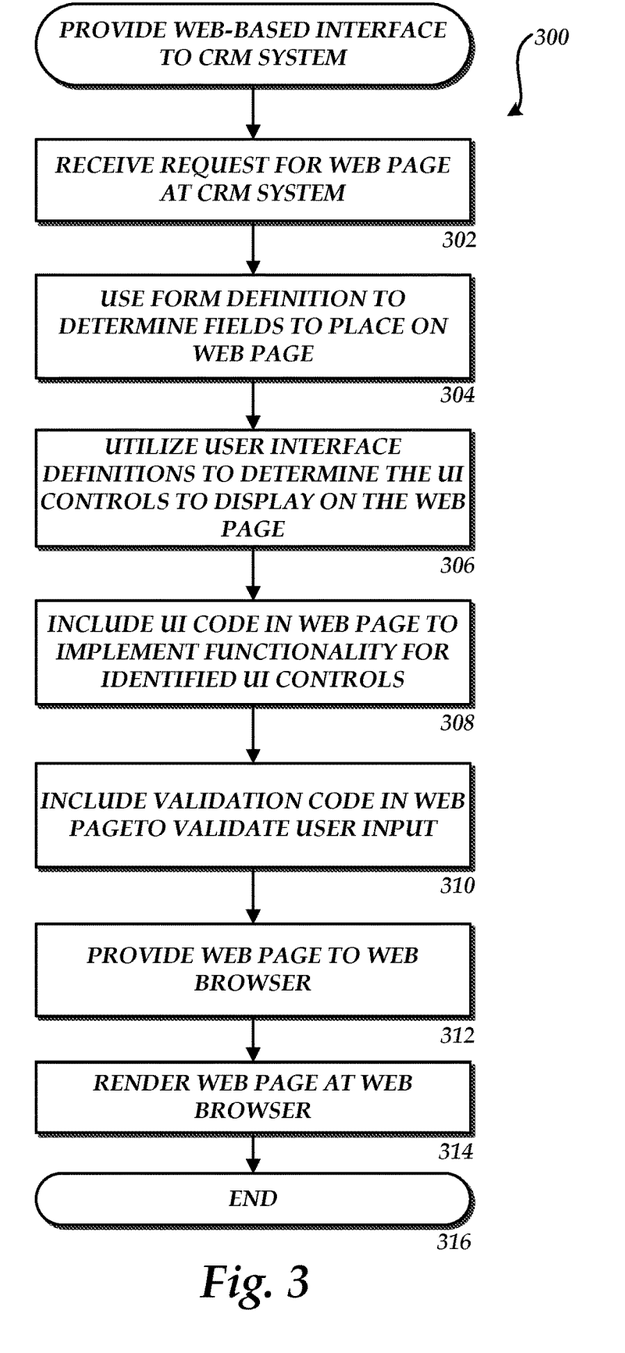
FIG. 3 is a flow diagram illustrating aspects of the operation of a CRM server computer and a PIM client application according to one embodiment disclosed herein.

Turning now to FIG. 3, additional details will be provided regarding the embodiments presented herein for integrating a Web-based CRM system and a PIM client application. In particular, FIG. 3 is a flow diagram showing a routine 300 that shows aspects of the operation the CRM server computer 120 for providing a Web-based UI for performing CRM tasks in one embodiment disclosed herein. FIG. 3 will be described in conjunction with FIG. 1.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the CRM server application 122 receives a request for a Web page. For instance, the CRM server application 122 may receive a request from the Web browser 106 for a Web page for sending a new e-mail message. In response to receiving such a request, the CRM server application 122 utilizes the form definitions 110 to determine the fields that should be placed in the Web page. For instance, the form definitions 110 may specify that the CRM fields 204A-204G are to be included on the Web page for creating a new e-mail message. Once the CRM server application 122 has determined the fields to be placed on the Web page, the routine 300 proceeds from operation 304 to operation 306.

At operation 306, the CRM server application 122 utilizes the user interface definitions 112 to determine the UI controls to be displayed on the Web page. The UI definitions 112 might specify that the UI controls 202B-202H should be displayed on the Web page for creating the e-mail message. From operation 306, the routine 300 proceeds to operation 308 where the CRM server application 122 includes UI code 114 in the Web page for implementing the functionality for the UI controls identified at operation 306. For instance, script code for implementing the functionality behind the UI controls might be included in the Web page. Other types of code for implementing the UI controls might also be generated and inserted into the Web page.

From operation 308, the routine 300 proceeds to operation 310 where the CRM server application 122 includes validation code 132 in the Web page. The validation code 132 comprises program code for validating user input into the fields displayed on the Web page. For instance, the validation code 132 might comprise scripts or other types of executable code configured to impose certain restrictions on the types of data that might be entered by way of the CRM fields shown in the Web page.

Once the Web page has been generated by the CRM server application 122, the Web page is provided to the Web browser 106 at operation 312. As discussed above, the Web page includes CRM fields specified by the form definitions 110, UI controls specified by the UI definitions 112, UI code 114 for implementing the UI controls, and, optionally, validation code 132 for validating user input in to the displayed fields.

The Web browser 106 renders the Web page provided by the CRM server application 122 at operation 314. A user of the CRM client computer 102 may then interact with the Web page by selecting the UI controls, entering data into the CRM fields, and performing other functions. The user may also elect to send the e-mail message defined by way of the Web page through the CRM server application 122. Data specified by way of the CRM fields may then be stored in the CRM database 124 and the sent e-mail message may be tracked by the CRM server application 122. From operation 314, the routine 300 proceeds to operation 316, where it ends.

Figure 4:
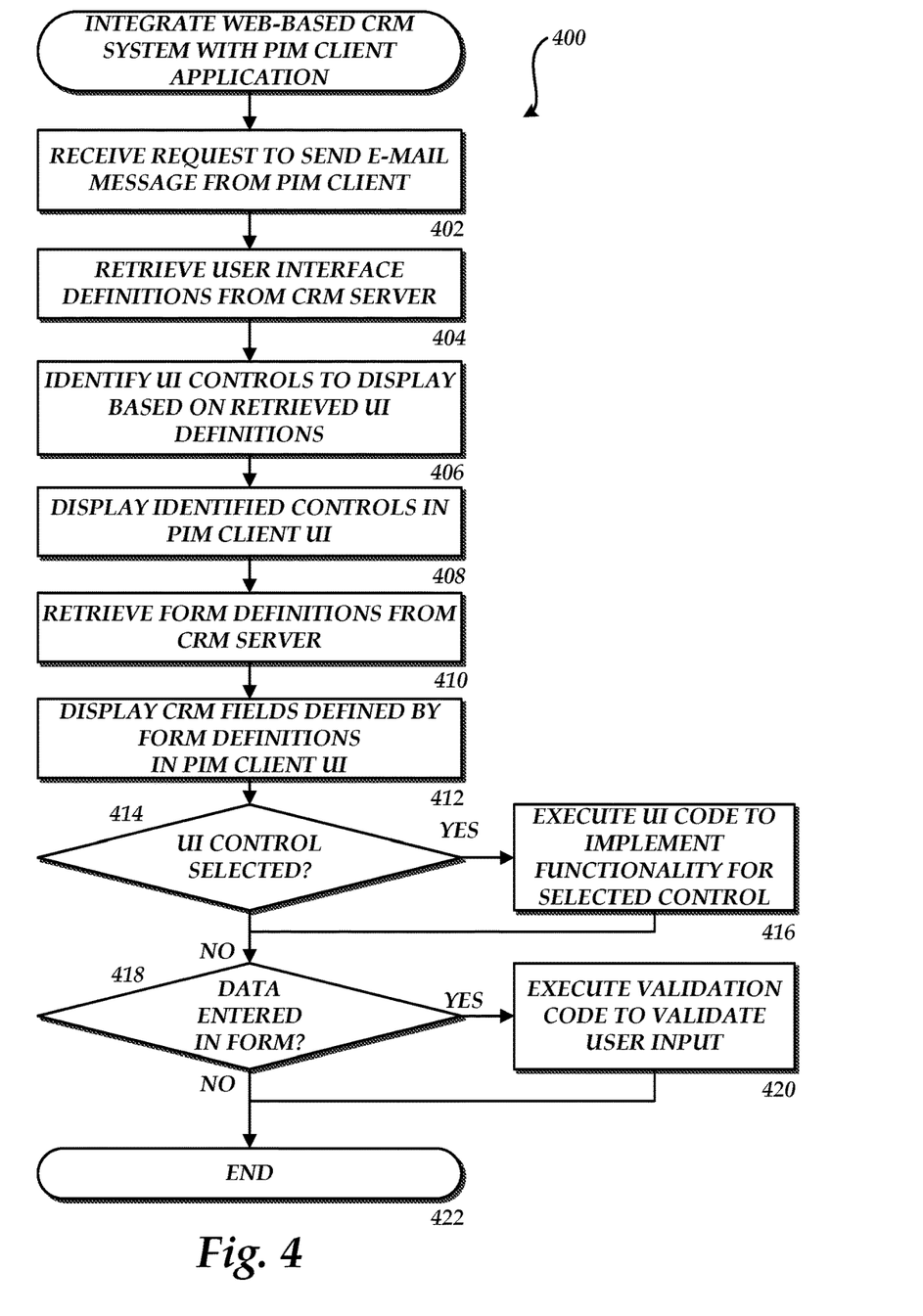
FIG. 4 is a flow diagram illustrating aspects of the operation of a CRM client plug-in according to one embodiment disclosed herein.

Referring now to FIG. 4, a flow diagram showing a routine 400 that illustrates aspects of the operation of the CRM plug-in 108 for integrating the Web-based CRM server computer 120 and the PIM client application 104 in one embodiment presented herein will be described. FIG. 4 will be described in conjunction with FIGS. 1 and 2A-2B.

The routine 400 begins at operation 402, where the PIM client application 104 receives a request to send an e-mail message from the PIM client application 104. As discussed above, the PIM client application 104 might utilize an e-mail server computer 130 in order to send e-mail messages. In response to receiving the request to send a new e-mail message, the PIM client application 104 displays a UI for creating the new e-mail message. For instance, the UIs 200A-200B shown in FIGS. 2A-2B and described above may be generated. As also discussed above, the UI controls 202A-202H may be displayed within the user interfaces 200A-200B by the CRM plug-in 108. In order to cause the UI controls 202A-202H to be displayed in the UIs 200A-200B, the CRM plug-in 108 retrieves the UI definitions 112 from the CRM server 120 at operation 404. The UI definitions 112 are the same UI definitions 112 utilized by the CRM server application 122 to generate the Web-based user interface described above.

Once the CRM plug-in 108 has retrieved the UI definitions 112 from the CRM server computer 120, the CRM plug-in 108 identifies the UI controls that should be displayed in the UIs 200A-200B based on the retrieved UI definitions 112. In one embodiment, some UI controls may be pre-defined UI controls that are mandatory and that must be displayed by the CRM plug-in 108. Other user-defined controls may also be specified within the UI definitions 112. An administrator of the CRM server computer 120 may specify the user-specified UI controls. According to one embodiment, the CRM plug-in 108 is configured to identify a subset of the UI controls specified by the UI definitions 112. For instance, the CRM plug-in 108 might identify a subset of the specified controls that is appropriate for inclusion within a particular UI, such as an e-mail inspector UI.

Once the CRM plug-in 108 has identified the UI controls 202A-202H that should be displayed within the UIs 200A-200B, the routine 400 proceeds from operation 406 to operation 408 where the CRM plug-in 108 causes the identified UI controls to be displayed in the UI 200A-200B generated by the PIM client application 104. As discussed above, the CRM plug-in 108 might utilize one or more public APIs exposed by the PIM client application 104 in order to cause the UI controls 202A-202H to be displayed in the UI 200A-200B.

From operation 408, the routine 400 proceeds to operation 410 where the CRM plug-in 108 retrieves the form definitions 110 from the CRM server computer 120. The form definitions 110 retrieved by the CRM plug-in 108 are the same form definitions 110 utilized by the CRM server application 122 to provide the Web-based UI described above. As also discussed above, the form definitions 110 specify the CRM fields 204A-204G that should be displayed by the CRM plug-in 108 within the UI 200A-200B. According to embodiments, the CRM plug-in 108 might identify a subset of the fields specified within the form definitions 110 to be displayed within the UIs 200A-200B. For instance, the CRM plug-in 108 might identify a subset of the specified fields that do not overlap with the fields natively displayed by the PIM client application 104 such as the e-mail recipients, carbon copy recipients, and subject of an e-mail message.

From operation 410, the routine 400 proceeds to operation 412 where the CRM plug-in 108 causes the PIM client application 104 to display the fields 204A-204G as defined by the form definitions 110 in the UI 200A-200B. The routine 400 then proceeds to operation 414 where a determination is made as to whether one of the UI controls 202A-202H has been selected. If so, the routine 400 proceeds to operation 416 where the UI code 114 is executed in order to implement the functionality provided by the selected UI controls 202A-202H. The UI code 114 executed to implement the functionality provided by the UI control in the context of the PIM client application 104 is the same UI code 114 that is utilized in order to implement UI controls provided by way of the Web user interface provided by the CRM server application 122. The UI code 114 is implemented within an invisible frame in one embodiment presented herein. From operation 416, the routine 400 proceeds to operation 418.

At operation 418, a determination is made as to whether data has been entered into the CRM fields 204A-204G. If so, the routine 400 proceeds from operation 418 to operation 420. At operation 420, the validation code 132 is executed in order to validate the user input. The validation code 132 executed in the context of the PIM client application 104 is the same validation code 132 that executes within the Web browser 106 in order to validate user input provided by way of the Web interface generated by the CRM server application 122. The validation code 132 is implemented within an invisible frame in one embodiment presented herein.

According to one implementation, the validation code 132 is also configured to validate input made to the native fields displayed by the PIM client application 104 in the UI 200A-200B. For instance, the validation code 132 can be configured to validate input made to the message recipient, carbon copy recipient, and subject fields displayed by the PIM client application 104 in the UIs 200A-200B. From operation 420, the routine 400 proceeds to operation 422, where it ends.

It should be appreciated that although the form definitions 110, UI definitions 112, UI code 114, and validation code 132 have been illustrated in FIG. 1 as being stored separately, these components may be stored together. For instance, in one embodiment, a single hypertext markup language ("HTML") document might define the fields to be shown on a Web page, the UI controls to be shown on the page, and include code (such as JAVASCRIPT) for implementing the UI controls and for validating user input. Other implementations might also be utilized.

Figure 5:
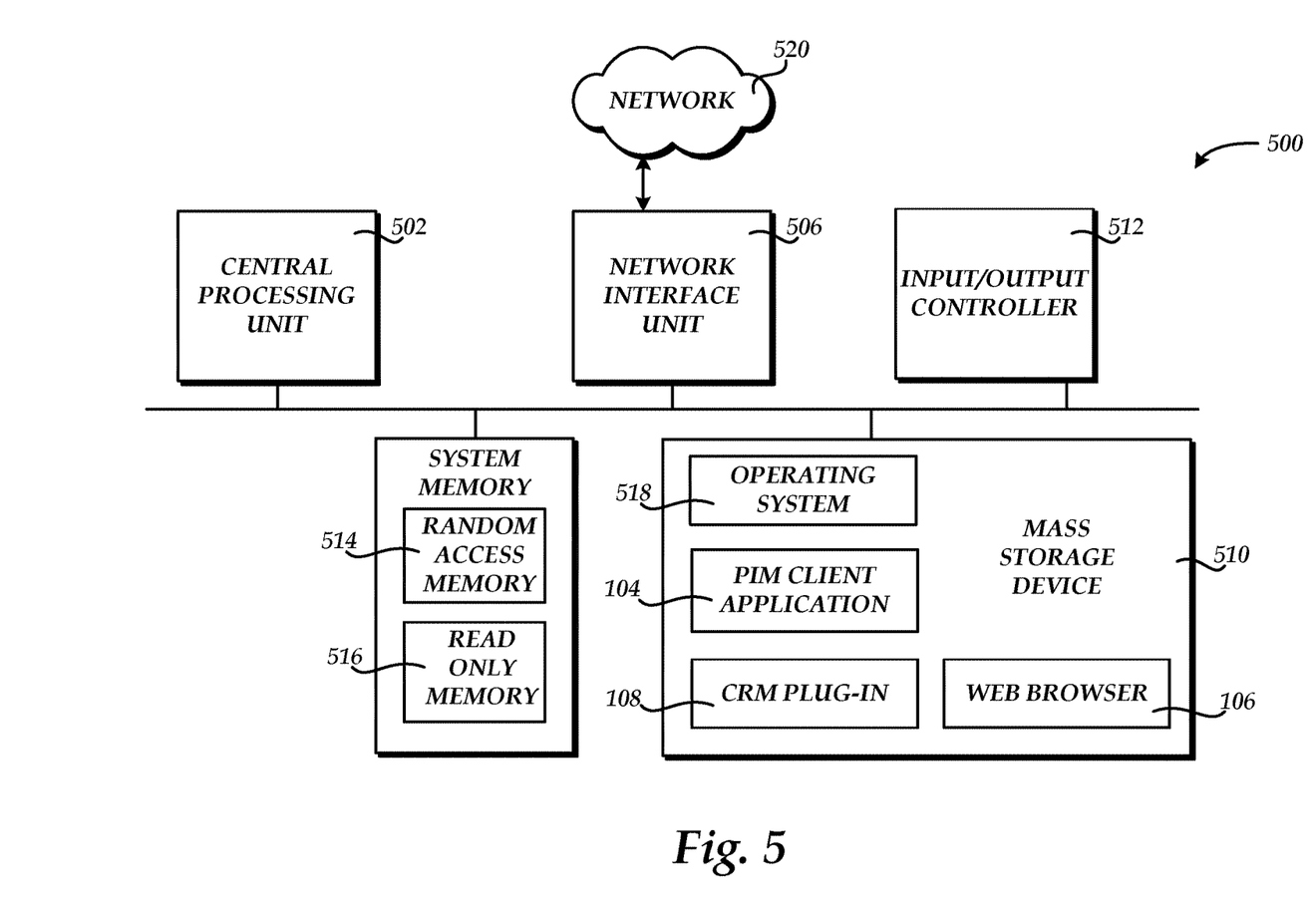
FIG. 5 is a computer architecture diagram showing an illustrative computer hardware and software architecture for a computing system capable of implementing the embodiments presented herein.

FIG. 5 shows an illustrative computer architecture for a computer 500 capable of executing the software components described herein for integrating a Web-based CRM system and a PIM client application 104. The computer architecture shown in FIG. 5 illustrates a conventional desktop, laptop computer, or server computer and may be utilized to execute the CRM plug-in 108, the PIM client application 104, the CRM server application 122, or any of the other software components described herein.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system ("BIOS") containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable storage media can be any available computer storage media that can be accessed by the computer 500.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500. As used herein, the term computer-readable storage media does not encompass transitory signals.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the PIM client application 104, the CRM plug-in 108, the Web browser 106, and the other program modules described above with respect to FIG. 1. The mass storage device 510 and RAM 514 may also store other program modules and data.

In general, software applications or modules may, when loaded into the CPU 502 and executed, transform the CPU 502 and the overall computer 500 from a general-purpose computing system into a special-purpose computing system customized to perform the functionality presented herein. The CPU 502 may be constructed from any number of transistors or other discrete circuit elements, which may individually or collectively assume any number of states. More specifically, the CPU 502 may operate as one or more finite-state machines, in response to executable instructions contained within the software or modules. These computer-executable instructions may transform the CPU 502 by specifying how the CPU 502 transitions between states, thereby physically transforming the transistors or other discrete hardware elements constituting the CPU 502.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for integrating a Web-based CRM system and a PIM client application have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and storage mediums are disclosed as example forms of implementing the claims.

The subject matter described above is provided by way of illustration only and should not be construed as limiting.

Various modifications and changes may be made to the subject matter described herein without following the example embodiments and applications illustrated and described, and without departing from the true spirit and scope of the present invention, which is set forth in the following claims.

What is claimed is:

1. A computer, comprising:
a processor; and
a memory in communication with the processor, the memory having instructions stored thereupon that, when executed by the processor, cause the processor to:
retrieve user interface (UI) code of a customer relationship management (CRM) system, the UI code defining a UI control of a UI of the CRM system and the UI code executable to implement functionality of a UI control;
integrate the UI code of the CRM system within a personal information management (PIM) client application, the PIM client application enabled to generate a PIM UI, and such that the functionality of the UI control is accessible within the PIM UI;
generate the PIM UI by the PIM client application stored in the memory;
generate and display the UI control within the PIM UI;
receive an input indicating selection of the UI control in the PIM UI; and
in response to receiving the input indicating selection of the UI control displayed in the PIM UI, execute the UI code to initiate a function corresponding to the UI control.

2. The computer of claim 1, wherein the memory has further computer-executable instructions stored thereupon which, when executed by the processor, cause the processor to:
retrieve a form definition from the CRM system, the form definition defining a CRM field in a form generated by the CRM system; and
generate the CRM field in the PIM UI.

3. The computer of claim 2, wherein the memory has further computer-executable instructions stored thereupon which, when executed by the processor, cause the processor to:
retrieve validation code for validating data input into the CRM field; and
execute the validation code.

4. The computer of claim 3, wherein the executing of the validation code validates data input into forms generated by the CRM system UI.

5. The computer of claim 2, wherein the form comprises an electronic mail (e-mail) message, and wherein the UI control corresponds to the function of tracking an e-mail message in the CRM system.

6. The computer of claim 1, wherein the integrating the UI of the CRM system comprises causing presentation of the UI of the CRM system, including the UI control, within the PIM UI.

7. The computer of claim 1, wherein the integrating the UI of the CRM system comprises mapping the UI control of the CRM system to the UI control of the PIM UI.

8. A computer-implemented method comprising:
retrieving user interface (UI) code defining a UI control of a customer relationship management (CRM) system and the UI code executable to implement functionality of the UI control;
integrating a UI code of the CRM system, including the UI control, within a personal information system (PIM) client application, the PIM client application enabled to generate a PIM UI, and such that the functionality of the UI control is accessible within the PIM UI;
generating and displaying the UI control in the PIM UI utilizing the UI code;
receiving an input indicating selection of the UI control in the PIM UI; and
in response to receiving the input indicating selection of the UI control, executing the UI code implementing a function corresponding to the UI control.

9. The computer-implemented method of claim 8, further comprising:
retrieving a form definition from the CRM system, the form definition defining a CRM field provided in a form generated by the CRM system; and
generating the CRM field in the PIM UI.

10. The computer-implemented method of claim 9, further comprising:
retrieving validation code for validating data input into the CRM field; and
executing the validation code.

11. The computer-implemented method of claim 10, wherein the executing of the validation code validates data input into forms generated by the CRM system UI.

12. The computer-implemented method of claim 8, wherein the integrating the UI of the CRM system comprises mapping the UI control of the CRM system to the UI control of the PIM UI.

13. The computer-implemented method of claim 8, wherein the integrating the UI of the CRM system comprises causing presentation of the UI of the CRM system, including the UI control, within the PIM UI.

14. A computer-readable storage medium having computer-executable instructions stored thereupon which, when executed by a computer, cause the computer to:
retrieve user interface (UI) code of a customer relationship management (CRM) system, the UI code defining a UI control of a UI of the CRM system and the UI code executable to implement functionality of a UI control;
integrate the UI code of the CRM system UI within a personal information management (PIM) client application, the PIM client application enabled to generate a PIM UI, and such that the functionality of the UI control is accessible within the PIM UI;
generate the PIM UI;
generate and display the UI control within the PIM UI;
receive an input indicating selection of the UI control in the PIM UI; and
in response to receiving the input indicating selection of the UI control displayed in the PIM UI, execute the UI code to request a function corresponding to the UI control.

15. The computer-readable medium of claim 14, having further computer-executable instructions stored thereupon which, when executed by the computer, cause the computer to:
retrieve a form definition from the CRM system, the form definition defining a CRM field in a form generated by the CRM system; and
generate the CRM field in the PIM UI.

16. The computer-readable storage medium of claim 15, having further computer-executable instructions stored thereupon which, when executed by the computer, cause the computer to:
retrieve validation code for validating data input into the CRM field; and
execute the validation code.

17. The computer-readable storage medium of claim 16, wherein the executing of the validation code validates data input into forms generated by the CRM system UI.

18. The computer-readable storage medium of claim 15, having further computer-executable instructions stored thereupon which, when executed by the computer, cause the computer to determine that the CRM field defined by the form definition does not overlap with a set of fields natively displayed by a PIM client application.

19. The computer-readable storage medium of claim 14, wherein the integrating the UI of the CRM system comprises mapping the UI control of the CRM system to the UI control of the PIM UI.

20. The computer of claim 14, wherein the integrating the UI of the CRM system comprises causing presentation of the UI of the CRM system, including the UI control, within the PIM UI.

\* \* \* \* \*